US012100304B2

(12) United States Patent
Winslow et al.

(10) Patent No.: US 12,100,304 B2
(45) Date of Patent: Sep. 24, 2024

(54) BLOCKCHAIN ENABLED AIRCRAFT SECURE COMMUNICATIONS

(71) Applicant: Gulfstream Aerospace Corporation, Savannah, GA (US)

(72) Inventors: Matthew Winslow, Savannah, GA (US); Scott Bohanan, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 366 days.

(21) Appl. No.: 17/247,575

(22) Filed: Dec. 16, 2020

(65) Prior Publication Data

US 2022/0189317 A1 Jun. 16, 2022

(51) Int. Cl.
*G08G 5/00* (2006.01)
*H04L 9/00* (2022.01)
*H04L 9/06* (2006.01)
*G06F 16/23* (2019.01)
*G06F 16/27* (2019.01)
*G06F 16/29* (2019.01)
(Continued)

(52) U.S. Cl.
CPC ......... *G08G 5/0043* (2013.01); *G08G 5/0013* (2013.01); *G08G 5/0091* (2013.01); *H04L 9/0643* (2013.01); *H04L 9/50* (2022.05); *H04L 2209/84* (2013.01)

(58) Field of Classification Search
None
See application file for complete search history.

(56) References Cited

U.S. PATENT DOCUMENTS 10,880,070 B1 * 12/2020 Delaney ................. G06F 21/64
11,334,882 B1 * 5/2022 Jameson ............... H04L 9/3231
(Continued)

FOREIGN PATENT DOCUMENTS

EP 3255460 A1 12/2017
WO WO-2016160593 A1 * 10/2016 ........... B64C 39/024
WO WO-2021052853 A1 * 3/2021 ............. G08G 5/003

OTHER PUBLICATIONS

Han Rui et al: "Blockchain-Based GNSS Spoofing Detection for Multiple UAV Systems", Journal of Communications and Information Networks, [Online] vol. 4, No. 2, Jun. 1, 2019 (Jun. 1, 2019), pp. 81-88, XP055878517.

*Primary Examiner* — Aniss Chad
*Assistant Examiner* — Madison R. Inserra
(74) *Attorney, Agent, or Firm* — Lorenz & Kopf, LLP

(57) ABSTRACT

A method and apparatus for providing distributed fleet communications between aircraft including decentralized location tracking, weather data, and fleet health is used to determine actual aircraft position, better weather data from multiple sources, and health data to help with logistical calculations and increase efficiencies. The communication is a distributed communication network using blockchains wherein the block includes a data, a hash and a prior hash, determining, by a processor, a validity of the block in response to a blockchain register stored on a memory, the hash and the prior hash, determining, by the processor. The processor is configured to generate a record to be added to the local copy of the blockchain ledger stored in the memory, then send an update to the fleet blockchain to be added as a valid record to be stored and used by the fleet or other trusted individual operators.

18 Claims, 5 Drawing Sheets

(51) Int. Cl.
*G06F 21/60* (2013.01)
*G06F 21/64* (2013.01)
*H04L 9/32* (2006.01)
*H04L 67/104* (2022.01)
*H04W 4/02* (2018.01)
*H04W 4/40* (2018.01)
*H04W 12/104* (2021.01)

(56) References Cited

U.S. PATENT DOCUMENTS

| | | |
|---|---|---|
| 2018/0225651 A1* | 8/2018 | Stone ................... H04L 67/12 |
| 2019/0080284 A1* | 3/2019 | Kim .................... H04L 63/0428 |
| 2019/0280871 A1 | 9/2019 | Subramanian |
| 2019/0334697 A1 | 10/2019 | Winslow et al. |
| 2020/0322041 A1 | 10/2020 | Chao et al. |
| 2021/0035457 A1* | 2/2021 | Pennapareddy ...... H04L 9/3239 |
| 2021/0209956 A1* | 7/2021 | Allouche .............. B64C 39/024 |
| 2021/0354855 A1* | 11/2021 | Kim ..................... H04L 9/3247 |
| 2022/0109563 A1* | 4/2022 | Cain, Jr. ............. H04L 63/0861 |

* cited by examiner

BLOCKCHAIN ENABLED AIRCRAFT SECURE COMMUNICATIONS

BACKGROUND

The present disclosure relates generally to secure aircraft communications systems. More specifically, aspects of this disclosure relate to systems, methods and devices for confirming an aircraft identity, aircraft health, aircraft location and/or proximate weather data using distributed fleet blockchain registers.

Operating aircraft use onboard sensors as well as information from other sources, such as other aircraft and ground stations, to determine their location and the location of other aircraft within an airspace. Determining an accurate aircraft location is essential to safe air traffic control to ensure safe distances between aircraft. Aircraft may receive data from proximate aircraft, such as weather information, occurrences of turbulence, sensor data as well as confirmation of self-location determination. It is desirable and safety critical to receive accurate information such that an aircraft and ground services may have an accurate map of the airspace.

Likewise, it is essential that the communications between aircraft and communications between ground station and aircraft is secure. An aircraft reporting an inaccurate location, a spoofing of an aircraft location, unauthorized air traffic control commands, or other aircraft communications by bad actors or faulty systems may result in significant risk to aircraft and passengers. It is desirable to address these problems and to provide secure aircraft communications between aircraft and ground stations. The above information disclosed in this background section is only for enhancement of understanding of the background of the invention and therefore it may contain information that does not form the prior art that is already known in this country to a person of ordinary skill in the art.

SUMMARY

Disclosed herein are aircraft communications systems and method and related control logic for provisioning aircraft communications systems, methods for making and methods for operating such systems, and vehicles equipped with such aircraft communications systems. By way of example, and not limitation, there is presented an aircraft configured to transmit and receive electronic data and a system and method to verify this data using secure blockchain confirmation.

In accordance with an aspect of the present disclosure, a blockchain enabled aircraft secure communications system including, but not limited to, a transceiver configured for receiving a block from an originating aircraft wherein the block includes a data, a hash and a prior hash, a memory configured for storing a blockchain register and an airspace map, a processor configured for determining a validity of the block in response to the blockchain register, the hash and the prior hash, determining a consistency of the data in response to the airspace map, determining a network consensus of the validity of the block, the processor being further operative to generate an updated blockchain register and an updated airspace map in response to the validity of the block, the network consensus and the consistency of the data, and a controller configured for controlling the aircraft in response to the updated airspace map.

In accordance with an aspect of the present disclosure, a method including, but not limited to, receiving, by a transceiver, a block from an originating aircraft wherein the block includes a data, a hash and a prior hash, determining, by a processor, a validity of the block in response to a blockchain register stored on a memory, the hash and the prior hash, determining, by the processor, a consistency of the data in response to an airspace map stored on the memory, determining, by the processor, a network consensus of the validity of the block, generating, by the processor, an updated blockchain register and an updated airspace map in response to the validity of the block, the network consensus and the consistency of the data, and controlling, by an aircraft controller, a host aircraft in response to the updated airspace map.

In accordance with an aspect of the present disclosure, a method including, but not limited to, receiving a block from an originating aircraft include a data, a hash and a prior hash, wherein the data includes a position of the originating aircraft, validating the block in response to the prior hash and a blockchain register, determining an inconsistency between the position of the originating aircraft and a prior position of the originating aircraft, rejecting the block, and transmitting an indication of the inconsistency to the originating aircraft The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
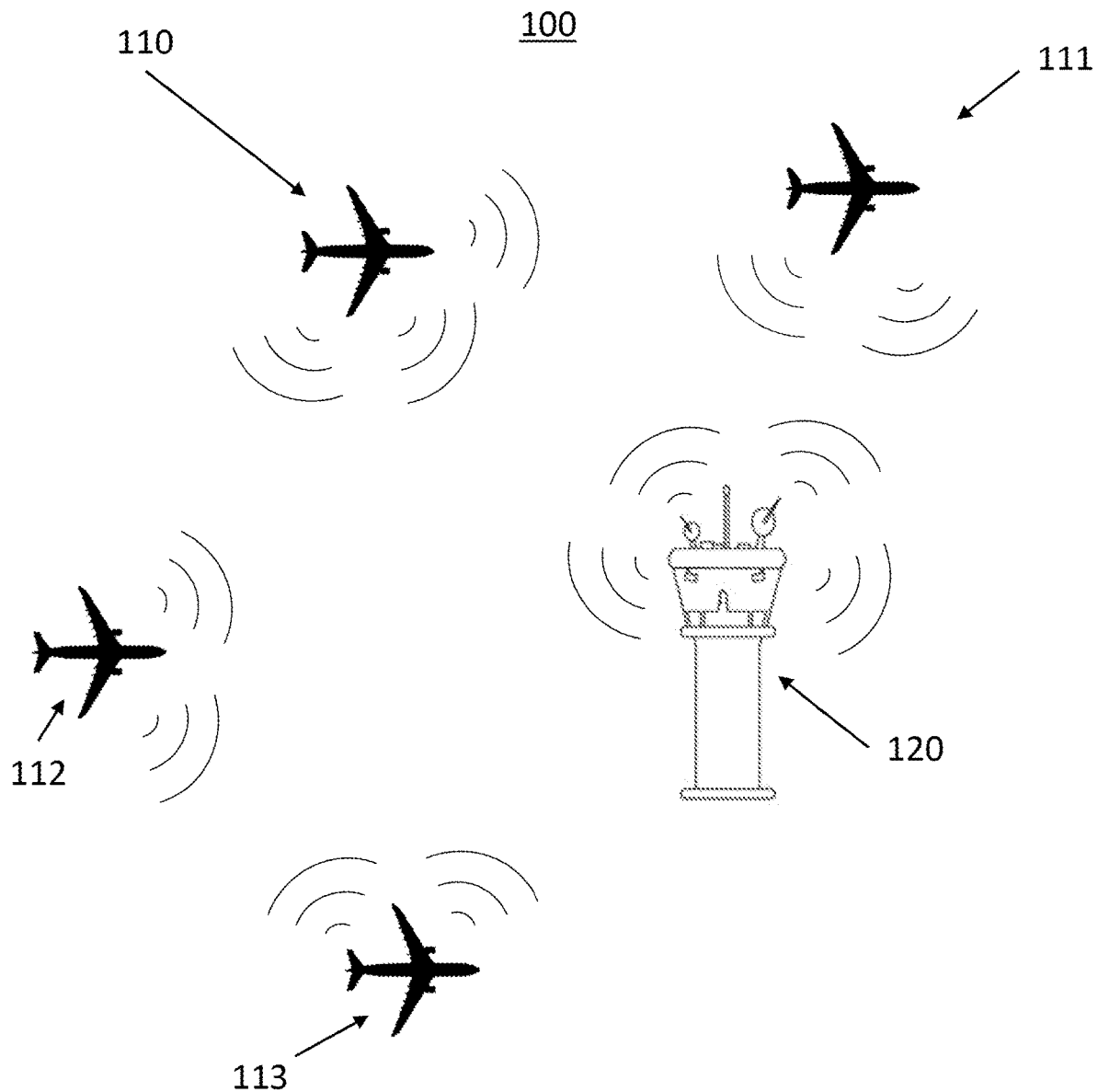
FIG. 1 shows a schematic view illustrating an operating environment for providing blockchain enabled aircraft secure communications according to an exemplary embodiment.

FIG. 1 schematically illustrates an exemplary operating environment 100 for providing blockchain enabled aircraft secure communications according to an exemplary embodiment of the present disclosure. The exemplary operating environment 100 depicts an airspace including a plurality of aircraft 110, 111, 112, 113 and a ground node 120, such as an air traffic control node. The exemplary aircraft 110, 111, 112, 113 and the ground node 120 may be configured as an aircraft to all communications network (A2X), wherein any aircraft within the network may communicate with any of the other aircraft and the ground node 120. In addition, the network may be a distributed fleet network.

During typical aircraft communications, security issues exist with an aircraft connecting and communicating wirelessly with another aircraft or ground stations. The exemplary system provides a method and apparatus for providing secure aircraft to aircraft and aircraft to air traffic control communications and data transfer in a total fleet configuration. In this exemplary embodiment, the plurality of aircraft 110, 111, 112, 113 act as a distributed network where every aircraft is an individual node that is securely connected and sending and receiving data using blockchains. The communications are facilitated using a distributed fleet blockchain mechanism. The distributed fleet blockchain mechanism addresses the connectivity security issues and provides a high level of confidence of the data integrity by using blockchains. For example, blockchain registers of aircraft locations may be maintained by each aircraft within the distributed fleet blockchain. Any block transmitted from outside of the distributed fleet network may be rejected as missing the required blockchain identifiers. A positional discontinuity in any aircraft position may then also be detected by one or more other aircraft within the fleet and a correct location may be transmitted back to the transmitting aircraft.

Air Traffic Control towers or other trusted sources can also act as a ground node 120 in the distributed fleet blockchain. Current aircraft communication methods, such as Automatic Dependent Surveillance-Broadcast (ADS-B) are not required to be encrypted and are prone to spoofed data, manipulated data, packet sniffing, and other attacks. Every node enrolled in the distributed fleet blockchain may transfer and receive data useful for identifying velocity, direction, altitude, global positioning system (GPS), Controller Pilot Data Link Communications (CPDLC), Traffic Alert and Collision Avoidance System (TCAS), weather data etc. to use for optimizing traffic congestion, positional awareness, and prevent collisions. The aircraft 110, 111, 112, 113 may also use the distributed fleet blockchain to record and send weather information to the rest of the fleet to have a more complete view of the surrounding weather, such as turbulent conditions and wind shears.

The distributed fleet blockchain may be used as a fleet health management tool. The aircraft in the fleet may send updates to the blockchain ledger which can then be analyzed for logistical improvements, GPS tracking, and weather anomalies. GPS tracking will be used by the trusted nodes to validate other aircraft positions and will correct or alert a node if GPS spoofing or jamming is being used. The aircraft 110, 111, 112, 113 may communicate with the distributed fleet blockchain or ground using a satellite link, Low Earth Orbiting satellite constellations, VHF, HF, Ku, Ka, or any other wireless aviation communication protocol. The node will add to the distributed fleet blockchain by starting a cryptographic hash function using Public Key Infrastructure (PKI), Merkle Tree, nonce, Secure Hash Algorithm 256 (SHA-256), and other common blockchain and cryptographic techniques. Once accepted as a verified block from a trusted node, a hash comparison of the previous block will occur to assure data integrity on the distributed fleet blockchain. If the block is verified and the comparison hash of the previous block succeeds, the block will be added to the distributed fleet blockchain ledger as a permanent record.

Every node in the distributed fleet blockchain may act as a consensus when sending, receiving, and comparing the data on the distributed fleet blockchain. This gives a high level of confidence that the data received is not compromised, manipulated, or spoofed. If any of the cryptographic functions fail, the block will be considered fraudulent and is excluded from the permissioned blockchain, PB, and network. If a previous block in the chain is altered, each hash solution for previous blocks becomes broken. All the nodes contained on the network will see that the broken chain does not agree with their own copy of the blockchain. The incorrect or altered block will not be recognized by the other nodes. This scheme is operating as a distributed consensus to verify that all data is correct.

Figure 2:
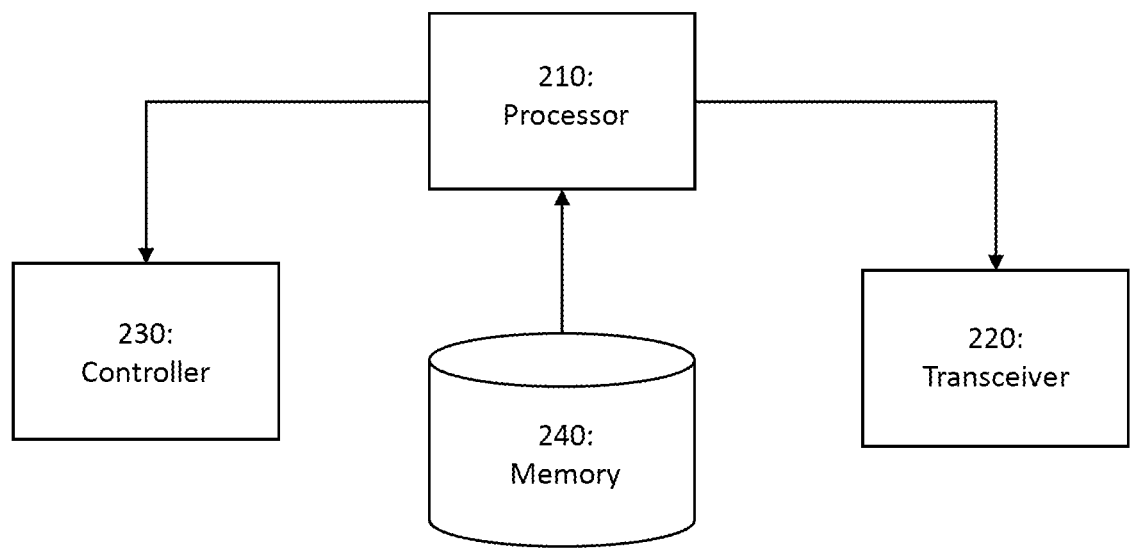
FIG. 2 shows a block diagram illustrating a system for providing blockchain enabled aircraft secure communications according to an exemplary embodiment.

Turning now to FIG. 2 is a schematic view illustrating an exemplary system 200 for providing blockchain enabled aircraft secure communications according to an exemplary embodiment of the present disclosure is shown. The exemplary system 200 may include a transceiver 220, a processor 210, a controller 230, and a memory 240. In this exemplary embodiment, the system 200 is described as, but is not limited to, aircraft equipment used in an aircraft. The exemplary system 200 may equally be employed in an air traffic control ground station or any other trusted node.

The transceiver 220 is configured to transmit and receive data from other nodes within the distributed fleet network. The data may include data useful for identifying velocity, direction, altitude, GPS, CPDLC, TCAS, weather data etc. to use for optimizing traffic congestion, positional awareness, and prevent collisions. The transceiver 220 may include a receiver and receive antenna and a transmitter and transmit antenna or any combination thereof.

In this exemplary embodiment, the processor 210 is configured to generate data for transmission to the distributed fleet network and to process data received from the distributed fleet network. For example, the processor 210 may receive a block transmitted by an originating aircraft in the distributed fleet network from the transceiver 220. The block may contain data may be indicative of aircraft position, altitude and velocity as well as a current block hash and a hash of a prior block. The processor 210 compares the hash of the prior block to a block chain register stored in the memory to verify the validity of the block. If the processor 210 confirms the validity of block, consensus of validly is then determined with the other nodes in the distributed network. In one exemplary embodiment, consensus of the validity of the blockchain may be determined through the practical byzantine fault tolerance algorithm (PBFT), the proof-of-work algorithm (PoW), the proof-of-stake algorithm (PoS), or the delegated proof-of-stake algorithm (DPoS). If consensus is achieved, the block information is added to the blockchain register in the memory. The processor 210 may then extract the data from the block.

In this exemplary embodiment, the processor 210 may use the data from the block, containing aircraft position, altitude and velocity of the originating aircraft to confirm radar data and/or generate a radar map of the proximate airspace. The processor 210 may further determine discrepancies between the data from the originating aircraft, the data transmitted in a prior block by the originating aircraft and/or data determined in response to the host aircraft sensors, radar data, and the like. If a discrepancy is determined by the host aircraft, the host aircraft may transmit a notice of discrepancy to the originating aircraft and the other nodes in the distributed fleet network. The host aircraft may transmit the data related to the originating aircraft as determined by the host aircraft to other nodes in the distributed fleet network. If there is consensus within the distributed fleet network that the data from the originating aircraft is erroneous, the data may be replaced with the consensus data and/or the erroneous data may be rejected. The originating aircraft may use the consensus data to establish or compensate for, a faulting sensor or other equipment issues. In addition, any distributed fleet node may send updates to the blockchain ledger which may later be analyzed for logistical improvements, GPS tracking, and weather anomalies The memory 240 is operative to store the distributed fleet blockchain and an airspace map or representation thereof. The distributed fleet blockchain may include data related to the blockchain, hash and prior hash for each of the blocks, etc. The blockchain ledger may be used by the processor 210 to confirm the validity of the block. In addition, the blockchain ledger may be coupled to other devices for later analysis such as logistical improvement, accident investigation, and the like.

The controller 230 provides data to the processor, such as aircraft velocity, direction and altitude determined via other aircraft sensors. The controller 230 may also provide radar data, radar maps, and other data related to detection of proximate aircraft to the processor 210. The controller 230 may also receive data from the processor 210 such as map data related to other aircraft positions and velocity. The controller 230 may then use this data to control the aircraft and/or update proximate object maps, radar maps, and the like.

Figure 3:
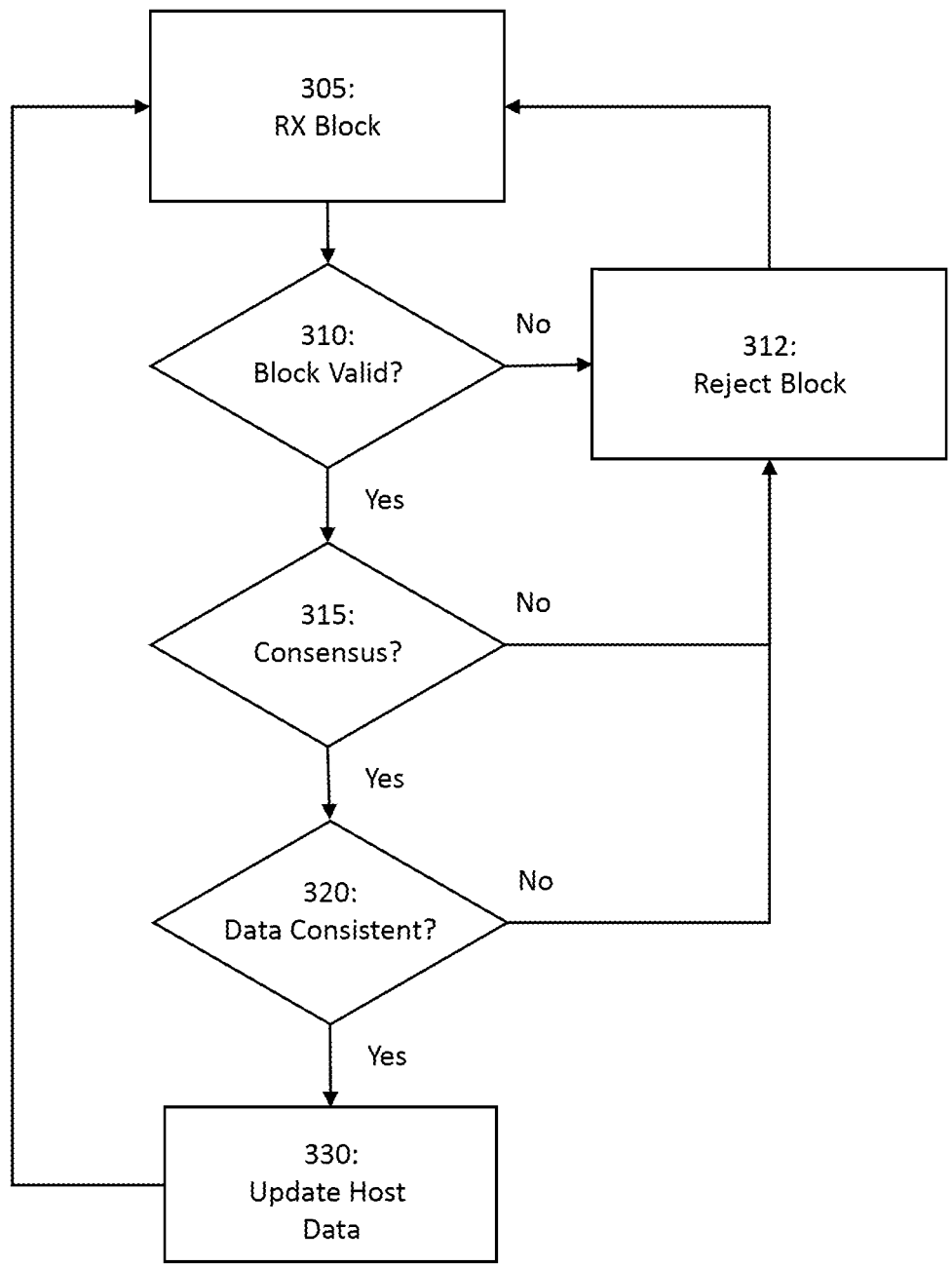
FIG. 3 shows a flow chart illustrating a method for providing blockchain enabled aircraft secure communications according to another exemplary embodiment

Turning now to FIG. 3, a block diagram illustrating an exemplary implementation of a method 300 for providing blockchain enabled aircraft secure communications according to an exemplary embodiment of the present disclosure is shown. The exemplary method may be performed by a blockchain enabled communications system forming a node of a fleetwide distributed network for transmitting and receiving aircraft location and performance data and local weather and other environmental data.

The method is first operative to receive 305 a block containing data from an originating aircraft. As part of a distributed fleet network, the block is transmitted to every node on the network by the originating aircraft. In this exemplary embodiment, the block may contain aircraft location, altitude and velocity data but may include any other pertinent data such as environmental data detected by the originating aircraft. The block includes the data as well as a hash and a prior hash used to determine validity of the block.

The method is next operative to determine 310 a validity of the block. The validity of the block may be determined by comparing the prior hash received with the block from the originating aircraft to the prior hash in the blockchain ledger stored on a memory in the host aircraft. The method may further mine the data within the block to determine the hash of the block. This determined hash may then be compared to the provided hash from the originating aircraft to confirm the validity of the data. Each node in the distributed network may perform this validation to confirm the validity of the block. If the block is determined to be not valid, the method rejects 312 the block and returns to wait for another block 305.

If the method performed by the host aircraft determines that the block is valid, the method then determines 315 if consensus of validity of the block has been achieved. In a blockchain distributed network, consensus among the nodes must be achieved before a block can be added to a block chain. Consensus may be achieved by each node confirming validity of a block and then notifying the other nodes in the distributed fleet network of the confirmation. Alternatively, a node may transmit a notice of invalidity if a block is found invalid. Consensus may be determined if no notice of invalidity is received during a predetermined duration of time. If consensus is not achieved 315, the method rejects 312 the block and returns to wait for another block 305.

If the block is confirmed to be valid, and consensus is achieved, the exemplary method next compares 320 the data from the block to prior data received in prior blocks to determine if the data is consistent. If the data is consistent with prior data, such as consistent position and velocity, the data is used to update, 330 confirm or augment proximate map data within the host aircraft. If the block is not consistent with prior data, such as a discontinuity in aircraft trajectory, the method may reject 312 the data from the originating aircraft. Inconsistent data may be indicative of one or more faulty sensors on the originating aircraft or a spoofing of an aircraft location by a bad actor. In addition, the host aircraft may notify the originating aircraft and/or other nodes in the distributed fleet network. In one embodiment, the host aircraft may also remove the block from the blockchain or not register the block in the blockchain register.

Figure 4:
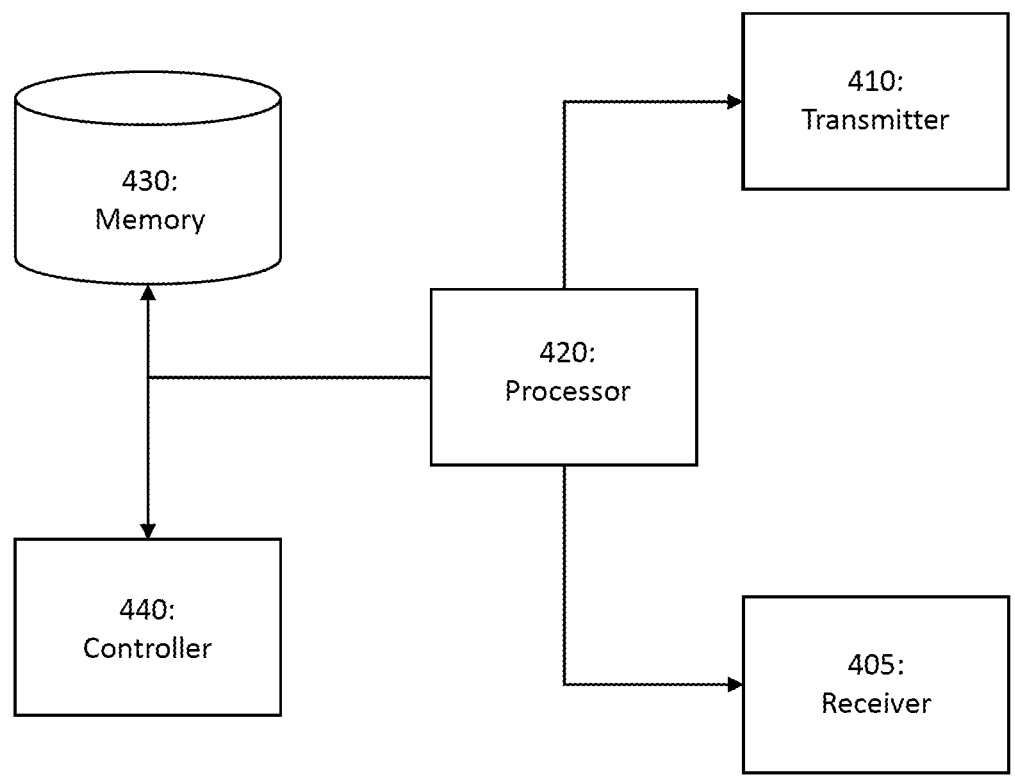
FIG. 4 shows a block diagram illustrating a system for providing blockchain enabled aircraft secure communications according to another exemplary embodiment.

Turning now to FIG. 4, a block diagram illustrating another exemplary implementation of a system 400 for providing blockchain enabled aircraft secure communications according to an exemplary embodiment of the present disclosure is shown. The system 400 may form part of a blockchain enabled aircraft secure communications system including a receiver 405, a transmitter 410, a processor 420, a memory 430, and a controller 440.

The receiver 405 is configured for receiving a block from an originating aircraft wherein the block includes a data, a hash and a prior hash. The block may be transmitted via a radio frequency communications network. In this example, the block is transmitted from the originating aircraft to all of the proximate nodes, including aircraft and ground nodes, on the distributed fleet network. In one exemplary embodiment, the data may include a velocity, an altitude, and a location of the originating aircraft. The data may include an environmental condition measured by the originating aircraft such as a location of air turbulence or an air pressure at a location.

The memory 430 may be configured for storing a blockchain register and an airspace map. The airspace map is a representation of locations of all proximate aircraft relative to ground position or the like. The airspace map may be used by aircraft operations and aircraft systems to identify positions of proximate aircraft such that the proximate aircraft may be avoided. The memory 430 may also store weather and environmental information measured by the host aircraft, other aircraft and ground-based information sources.

The processor 420 may be configured for determining a validity of the block in response to the blockchain register, the hash and the prior hash. In one exemplary embodiment, the processor 420 may establish a validity of the block in response to a comparison of a prior hash in the blockchain register and the prior hash included with the received block. The block may be rejected in response to determining an invalidity of the block. The processor 420 may also determine a consistency of the data in response to the airspace map. For example, if the position of the originating aircraft as indicated in the data of the received block is not consistent with a prior location of the originating aircraft as indicated in the airspace map, the data from the block may be rejected. An example of an inconsistency is an aircraft travelling in a westerly direction at 500 knots suddenly relocates 100 miles east of the prior location. This change in position is unlikely and may be indicative of a sensor error on the originating aircraft or a spoofing attempt by a bad actor. In one exemplary embodiment, the consensus may be determined by a trusted node in response to a plurality of distributed fleet network nodes and transmitted to the processor 420 via the receiver 405. The trusted nodes in the distributed fleet determine consensus, including trusted ground nodes.

The system 400 may be configured to transmit, via the transmitter 410, the validity of the block to a plurality of distributed fleet network nodes. Likewise, the system 400 may transmit, via the transmitter 410, a notification of an inconsistency of the data to the originating aircraft and/or a plurality of distributed fleet network nodes. The plurality of distributed fleet network nodes may then detect the location of the originating aircraft and provide the detected location to other nodes, including the originating aircraft, in the distributed fleet network.

The processor 420 may be configured for determining a network consensus of the validity of the block. The network consensus may be determined by positive validity indications received from a majority of the network nodes, or an absence of a majority of invalidity indications received from a majority of network nodes. If the data is valid and consistent, the processor 420 may the generate an updated blockchain register and an updated airspace map. The controller 440 may then control the aircraft, and/or an aircraft display or user interface, in response to the updated airspace map. For example, the controller 440 may display a representation of the updated airspace may to a pilot of the aircraft.

Figure 5:
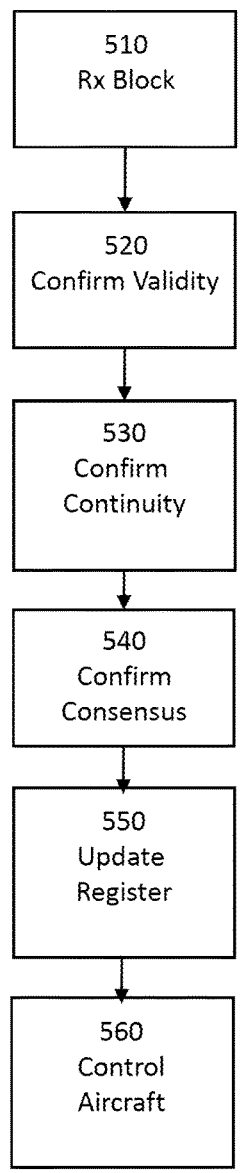
FIG. 5 shows a flow chart illustrating a for providing blockchain enabled aircraft secure communications according to another exemplary embodiment.

Turning now to FIG. 5, a flow chart illustrating an exemplary implementation of a method 500 for providing blockchain enabled aircraft secure communications according to an exemplary embodiment of the present disclosure is shown. In this exemplary embodiment, the method 500 may be a method of transmitting data between aircraft. Initially, the method may receive 510 a block from an originating aircraft wherein the block includes a data, a hash and a prior hash. The block may be received via a radio frequency communications channel by a transceiver or a receiver. wherein the data includes a velocity, an altitude, and a location of the originating aircraft. wherein the data includes an environmental condition measured by the originating aircraft.

The method then determines 520, using a processor or other computing device, a validity of the block in response to a blockchain register stored on a memory, the hash and the prior hash. If the block is determined invalid, such as when the prior hash indicated in the block does not match the prior has indicated in the block chain register, the block may be rejected and not entered into the blockchain register. The data in the block may also be determined to be invalid or unreliable.

If the block is determined to be valid, the method is next operative for determining 530 a consistency of the data in response to an airspace map stored on the memory. The consistency may be determined in response to a reasonable continuity of the data provided in the block compared to prior data used to update the airspace map. For example, if an originating aircraft suddenly jumps in location or altitude inconsistent with the velocity of the aircraft, the data may be determined to not have reasonable continuity and may be rejected. In addition, if the data does not have a reasonable continuity, the block may be rejected and not registered on the block chain register.

In one embodiment, if the block is valid and the data has continuity, the method may then determining 540 a network consensus of the validity of the block; wherein the consensus is determined by a ground node in response to data provided by a plurality of distributed fleet network nodes. Consensus may be determined in response to a plurality of validity determinations received from a plurality of distributed fleet network nodes. Alternatively, consensus may be determined in response to an absence of any invalidity indications received from other nodes in the network.

If the blocks are found to be valid, the data has continuity, and there is consensus among the distributed fleet network nodes, the blockchain register and the airspace map may be updated 550 in response to the data within the block. The method may then control 560 the host aircraft in response to the updated airspace map. For example, a flight controller may be used to control velocity of the aircraft in response to the updated airspace map.

The method may transmit the validity of the block to a plurality of distributed fleet network nodes. The method may further transmit a notification of an inconsistency of the data to the originating aircraft. is further configured to transmit a notification of an inconsistency of the data to a plurality of distributed fleet network nodes.

In one exemplary embodiment, the method 500 is operative for receiving a block from an originating aircraft including a data, a hash and a prior hash, wherein the data includes a position of the originating aircraft and validating the block in response to the prior hash and a blockchain register. The method is next operative for determining an inconsistency between the position of the originating aircraft and a prior position of the originating aircraft. If the inconsistency is determined, the method may rejected the block and transmit an indication of the inconsistency to the originating aircraft. In addition, the method may determine a current location of the originating aircraft and transmit the currently location of the originating aircraft with the indication of the inconsistency to the originating aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A blockchain enabled aircraft secure communications system comprising:
   a transceiver configured for receiving a block from an originating aircraft wherein the block includes a data, a hash and a prior hash and wherein the data includes a velocity, an altitude, and a location of the originating aircraft and to transmit a consensus data to the originating aircraft;
   a memory configured for storing a blockchain register and an airspace map of an airspace;
   a processor configured for determining a validity of the block in response to the blockchain register, the hash and the prior hash, determining a consistency of the data in response to the validity of the block, the airspace map and a prior data indicative of a prior location of the originating aircraft from the blockchain register, transmitting an indication of the validity of the block and the consistency of the data to a plurality of distributed fleet network nodes wherein each of the plurality of distributed fleet network nodes is an aircraft within the airspace and wherein each of the plurality of distributed fleet network nodes stores a blockchain register of aircraft locations, determining a network consensus of the validity of the block and the consistency of the data determined in response to a plurality of validity determinations and a plurality of data determined by the plurality of distributed fleet network nodes received from the plurality of distributed fleet network nodes, rejecting the block in response to receiving a notice of invalidity from at least one of the plurality of distributed fleet network nodes, generating the consensus data in response to the plurality of data determined by the plurality of distributed fleet network nodes, and coupling the consensus data to the transceiver, the processor being further operative to generate an updated blockchain register and an updated airspace map in response to the validity of the block, the network consensus and the consistency of the data; and
   a controller configured for controlling the aircraft in response to the updated airspace map.

2. The blockchain enabled aircraft secure communications system of claim 1, wherein the block is rejected in response to determining an invalidity of the block.

3. The blockchain enabled aircraft secure communications system of claim 1, wherein the network consensus is determined by a trusted node in response to the plurality of distributed fleet network nodes.

4. The blockchain enabled aircraft secure communications system of claim 1, wherein the data includes an environmental condition measured by the originating aircraft.

5. The blockchain enabled aircraft secure communications system of claim 1, wherein the transceiver is further configured to transmit the validity of the block to the plurality of distributed fleet network nodes.

6. The blockchain enabled aircraft secure communications system of claim 1, wherein the originating aircraft is operative to update at least one of the velocity, altitude, and location of the originating aircraft in response to the rejection of the notice of invalidity.

7. The blockchain enabled aircraft secure communications system of claim 1, wherein the transceiver is further configured to transmit a notification of an inconsistency of the data to the originating aircraft.

8. The blockchain enabled aircraft secure communications system of claim 1, wherein the transceiver is further configured to transmit a notification of an inconsistency of the data to the plurality of distributed fleet network nodes.

9. A method of transmitting data comprising:
   receiving, by a transceiver, a block from an originating aircraft wherein the block includes a data, a hash and a prior hash and wherein the data includes a velocity, an altitude, and a location of the originating aircraft;
   determining, by a processor, a validity of the block in response to a blockchain register stored on a memory, the hash and the prior hash;
   determining, by the processor, a consistency of the data in response to the validity of the block, an airspace map of an airspace and a prior data indicative of a prior location of the originating aircraft from the blockchain register stored on the memory;
   transmitting an indication of the validity of the block and the consistency of the data to a plurality of distributed fleet network nodes wherein each of the plurality of distributed fleet network nodes is an aircraft within the airspace and wherein each of the plurality of distributed fleet network nodes stores a blockchain register of aircraft locations;
   determining, by the processor, a consensus of the validity of the block and the consistency of the data in response to a plurality of validity determinations and a plurality of data determined by the plurality of distributed fleet network nodes received from the plurality of distributed fleet network nodes;
   rejecting the block in response to receiving a notice of invalidity from at least one of the plurality of distributed fleet network nodes;
   generating a consensus data in response to the plurality of data determined by the plurality of distributed fleet network nodes;
   generating, by the processor, an updated blockchain register and an updated airspace map in response to the validity of the block, the consensus and the consistency of the data; and
   controlling, by an aircraft controller, a host aircraft in response to the updated airspace map.

10. The method of transmitting data between the originating aircraft and a host aircraft of claim 9, wherein the block is rejected in response to determining an inconsistency of the block.

11. The method of transmitting data between the originating aircraft and a host aircraft of claim 9, wherein the consensus is determined by a ground node in response to the plurality of distributed fleet network nodes.

12. The method of transmitting data between the originating aircraft and a host aircraft of claim 9, wherein the data includes an environmental condition measured by the originating aircraft.

13. The method of transmitting data between the originating aircraft and a host aircraft of claim 9, wherein the transceiver is further configured to transmit the validity of the block to the plurality of distributed fleet network nodes.

14. The method of transmitting data between the originating aircraft and a host aircraft of claim 9, wherein the consensus is determined in response to the plurality of validity determinations received from the plurality of distributed fleet network nodes.

15. The method of transmitting data between the originating aircraft and a host aircraft of claim 9, wherein the transceiver is further configured to transmit a notification of an inconsistency of the data to the originating aircraft.

16. The method of transmitting data between the originating aircraft and a host aircraft of claim 9, wherein the transceiver is further configured to transmit a notification of an inconsistency of the data to the plurality of distributed fleet network nodes.

17. A distributed fleet communications method comprising:
- receiving a block from an originating aircraft including a data, a hash and a prior hash, wherein the data includes a position, a velocity, and an altitude of the originating aircraft;
- validating the block in response to the prior hash and a blockchain register;
- determining a consistency of the data in response to a validity of the block, an airspace map of an airspace and a prior data indicative of a prior location of the originating aircraft from the blockchain register stored on a memory;
- transmitting an indication of a validity of the block and the consistency of the data to a plurality of distributed fleet network nodes wherein each of the plurality of distributed fleet network nodes is an aircraft within the airspace and wherein each of the plurality of distributed fleet network nodes stores a blockchain register of aircraft locations;
- determining, a network consensus of the validity of the block and the consistency of the data in response to a plurality of validity determinations and a plurality of data received from the plurality of distributed fleet network nodes;
- rejecting the block in response to receiving a notice of invalidity from at least one of the plurality of distributed fleet network nodes;
- generating a consensus data in response to the plurality of data determined by the plurality of distributed fleet network nodes;
- generating, an updated blockchain register and an updated airspace map in response to the validity of the block, the network consensus and the consistency of the data; and
- controlling, a host aircraft in response to the updated airspace map.

18. The distributed fleet communications method of claim 17, including determining a current location of the originating aircraft and wherein the indication of the consistency of the data from the originating aircraft includes the current location of the originating aircraft and the prior location of the originating aircraft stored in the blockchain register.

* * * * *